(12) United States Patent
Murata

(10) Patent No.: US 6,393,058 B1
(45) Date of Patent: May 21, 2002

(54) MOVING PICTURE CODING SYSTEM HAVING A QUANTIZER CONTROLLED IN ACCORDANCE WITH AMOUNT OF MOTION BETWEEN SUCCESSSIVE FRAMES

(75) Inventor: Eri Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 1278 days.

(21) Appl. No.: 08/716,615

(22) Filed: Sep. 19, 1996

Related U.S. Application Data

(63) Continuation of application No. 08/291,712, filed on Aug. 16, 1994, now abandoned.

(30) Foreign Application Priority Data

Aug. 17, 1993 (JP) .............................................. 5-203119

(51) Int. Cl.⁷ ................................................. H04N 7/18
(52) U.S. Cl. .............................. 375/240.02; 375/240.03
(58) Field of Search ................................. 348/405, 409, 348/411, 412, 404, 403; 375/240.01–240.07

(56) References Cited

U.S. PATENT DOCUMENTS

| | | | | |
|---|---|---|---|---|
| 4,862,173 A | * | 8/1989 | Nishitani | 348/419 |
| 5,038,209 A | * | 8/1991 | Hang | 348/419 |
| 5,063,608 A | * | 11/1991 | Siegel | 348/405 |
| 5,231,484 A | * | 7/1993 | Gonzales et al. | 348/405 |
| 5,249,053 A | * | 9/1993 | Jain | 348/419 |
| 5,299,019 A | * | 3/1994 | Pack et al. | 348/419 |
| 5,333,012 A | * | 7/1994 | Singhal et al. | 348/419 |
| 5,396,567 A | * | 3/1995 | Jass | 348/405 |
| 5,426,463 A | * | 6/1995 | Reininger et al. | 348/405 |
| 5,481,309 A | * | 1/1996 | Juri et al. | 348/415 |

OTHER PUBLICATIONS

Takishima et al., "A Study on Control Method For Low Bit Rate Video Coding", D–311, *Spring National Meeting of the Electronic Information Communications Society*, (1990).

* cited by examiner

*Primary Examiner*—Andy Rao
(74) *Attorney, Agent, or Firm*—Foley & Lardner

(57) ABSTRACT

A moving picture coding system for controlling a quantizer in response to a generated bit amount is improved in that moving pictures are coded depending on whether frames of the moving pictures attach greater importance on the motion smoothness or on the image clarity. A quantization variation value which is a variation of a quantization step size between different frames is calculated by a variation value calculation section from a bit amount calculated by a generated bit amount calculation section. The quantization variation value is positive or negative in sign with a frame which involves a great amount or a small amount of variation. Only when the quantization variation value is positive or negative in sign, the frame is determined by a variation value correction frame determination section as a frame for which correction of the variation value should be performed. For a frame for which correction of the variation value should be performed, correction is performed by a variation value correction section so that the absolute value of the variation value is greater than that of the last frame, and the thus corrected variation value is transmitted to a quantization determination section.

7 Claims, 4 Drawing Sheets

MOVING PICTURE CODING SYSTEM HAVING A QUANTIZER CONTROLLED IN ACCORDANCE WITH AMOUNT OF MOTION BETWEEN SUCCESSSIVE FRAMES

This application is a continuation of application Ser. No. 08/291,712, filed Aug. 16, 1994, now abandoned.

BACKGROUND OF THE INVENTION

1. Field of the Invention

This invention relates to a moving picture coding system wherein a quantizer is controlled by the amount of generated bits.

2. Description of the Related Art

In a conventional moving picture coding system, a quantization step size is controlled in accordance with the amount of generated bits as disclosed, for example, in "A Study on Control Method for Low Bit Rate Video Coding", Collection of Drafts D-311 for the Spring National Meeting of the Electronic Information Communications Society in 1990.

The conventional moving picture coding system disclosed is shown in block diagram in FIG. 4. Referring to FIG. 4, the moving picture coding system shown includes a generated bit amount calculation section 14 which calculates and supplies a generated bit amount I to a quantization variation value calculation section 15 by way of a signal line 20. The quantization variation value calculation section 15 first multiplies the generated bit amount I received by way of the signal line 20 and a first differential value (differential value of a generated bit amount between different frames) I' of the generated bit amount I by a sensitivity coefficient to calculate a variation value ΔQ of a quantization step size and sends the thus calculated variation value ΔQ to a quantization determination section 16 by way of a signal line 21. The quantization determination section 16 adds the quantization variation value received by way of the signal line 21 to a quantization step size of the last frame to determine a new quantization step size for a current frame and sends the thus determined quantization step size to a coding section 17 by way of a signal line 22. The coding section 17 performs coding using the quantization step size thus received by way of the signal line 22.

In the conventional moving picture coding system described above, the quantization step size is determined only based on a quantitative value of a generated bit amount with equal sensitivity for any scene, without considering the scene contents whether the active images with a great amount of motion accordingly attach greater importance to the motion smoothness than to the image clarity or the still images with a small amount of motion accordingly attach greater importance to the image clarity than to the motion smoothness. Therefore, where the sensitivity of the quantization step size to the variation of the bit amount is low, in active frames with a great amount of motion, the variation of the quantizer is so low that dropped or missing frames are increased, resulting in loss of motion smoothness, but in still frames with small motion, much time is required until the quantization step size is reduced low and consequently the image clarity does not rise rapidly.

On the contrary where the sensitivity of the quantization step size to the variation of the bit amount is high, the quantizer varies in response to a small amount of variation of the bit amount, and consequently, the quantizer step size is unstable. In this manner, where the quantization step size is determined only based on a bit amount, it is difficult to determine a sensitivity coefficient adaptively for any scene.

SUMMARY OF THE INVENTION

It is an object of the present invention to provide a moving picture coding system which allows moving pictures to be observed subjectively easily whether frames of the moving pictures attach great importance to the motion smoothness or the image clarity.

In order to attain the object described above, according to the present invention, there is provided a moving picture coding system which includes a quantizer for quantization processing, which comprises generated bit amount calculation means for calculating a generated bit amount for each coded frame, quantization variation value calculation means for calculating a quantization variation value which is a variation of a quantization step size from the generated bit amount calculated by the generated bit amount calculation means, variation value correction frame determination means for determining a frame as a frame for which correction of the quantization variation value should be performed when the frame involves a large amount of motion and the quantization variation value is positive in sign or when the frame involves a small amount of motion and the quantization variation value is negative in sign, variation value correction means for correcting, for a frame which is determined as a frame for which correction should be performed by the variation value correction frame determination means, the quantization variation value calculated by the quantization variation value calculation means so as to increase the variation of the quantizer, and quantization determination means for adding the quantization variation value corrected by the variation value correction means to a quantization step size of the last frame to calculate a new quantization step size for a current frame.

The variation value correction frame determination means may include moving block determination means for calculating the sum of the absolute values of differential signals between the last frame and the current frame for each block to determine moving blocks, moving block number calculation means for calculating the number of moving blocks based on the results of determination of the moving block determination section for each block, and correction frame determination means for determining a frame as a frame for which correction of the quantization variation value should be performed when the number of moving blocks of the frame calculated by the moving block number calculation section is higher than a predetermined threshold value for a moving frame and the quantization variation value calculated by the quantizer variation value calculation section is positive in sign or when the number of moving blocks is lower than a predetermined threshold value for a stationary frame and the quantization variation value is negative in sign.

Where the moving picture coding system further comprises a motion compensation interframe prediction section, the variation value correction frame determination section may include moving block number calculation means for counting the number of blocks whose motion vector is determined to be a non-zero vector by the motion compensation interframe prediction section, and correction frame determination means for determining a frame as a frame for which correction of the variation value should be performed when the number of moving blocks calculated by the moving block number calculation section is higher than a predetermined threshold value for a moving frame and the quantization variation value calculated by the quantization variation value calculation section is positive in sign or when the number of moving blocks is lower than a predetermined threshold value for a stationary frame and the quantization variation value is negative in sign.

In the moving picture coding system, where the quantization variation value calculated by the quantization variation value calculation means is represented by $\Delta Q$, the variation value correction means corrects the quantization variation value $\Delta Q$ so that it may be increased in absolute value. The variation value $\Delta Q$ is corrected when the frame is a moving frame and $\Delta Q > 0$ or when the frame is a stationary frame and $\Delta Q < 0$. Consequently, in active frames with a large amount of motion, a coarser quantization step size is selected to achieve smooth motion. But in the still frames with a small amount of motion, a finer quantization step size is selected to get image clarity.

Since the variation value of the quantization step size is corrected in accordance with scene contents and a quantizer is controlled adaptively depending upon whether the scene attaches great importance to the motion smoothness or to the image clarity and subjective image quality is improved.

The above and other objects, features and advantages of the present invention will become apparent from the following description and the appended claims, taken in conjunction with the accompanying drawings in which like parts or elements are denoted by like reference characters. dr

DESCRIPTION OF THE PREFERRED EMBODIMENTS

Figure 1:
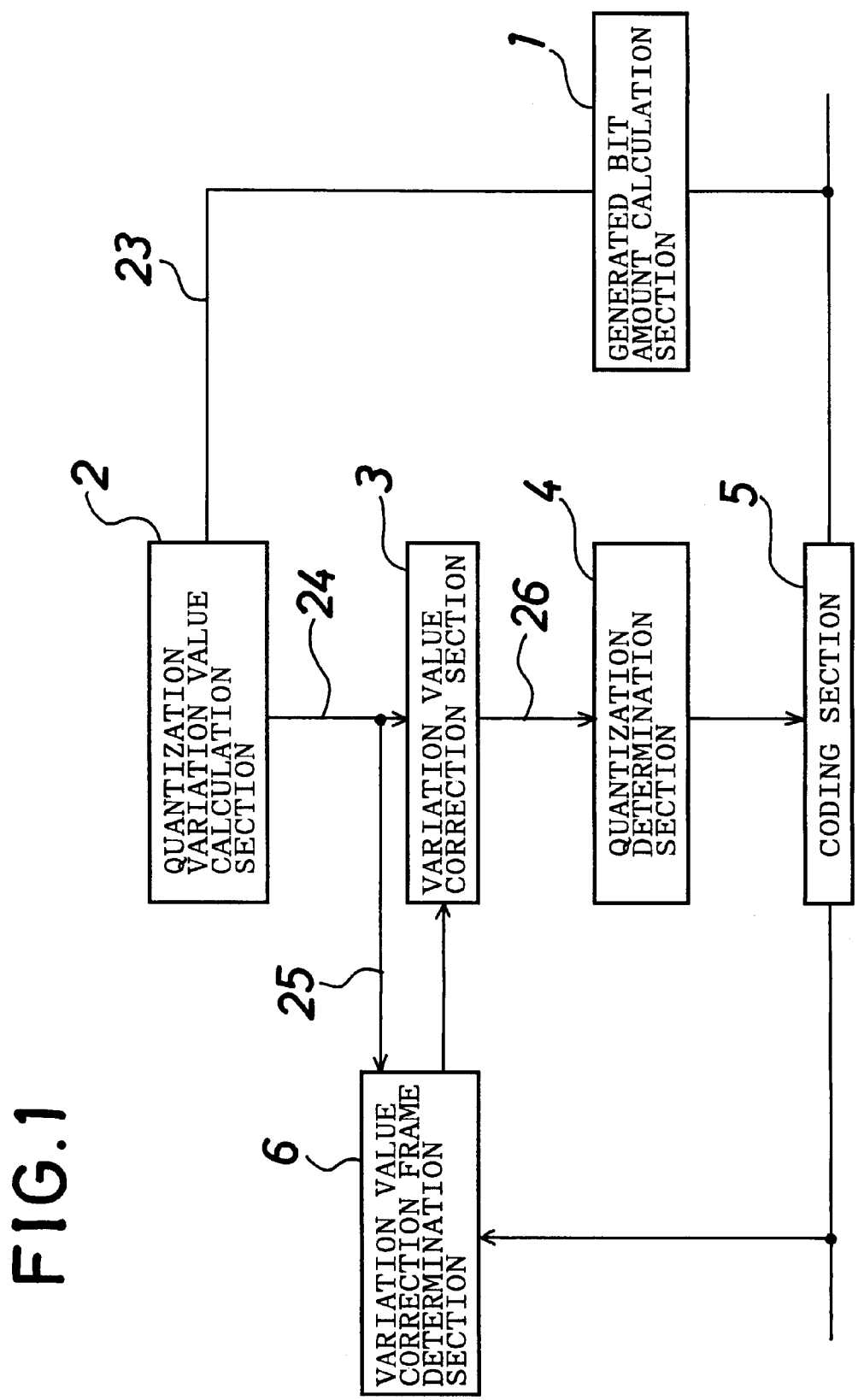
FIG. 1 is a block diagram of a moving picture coding system showing a first preferred embodiment of the present invention.

Referring first to FIG. 1, there is shown a moving picture coding system according to a first preferred embodiment of the present invention. The moving picture coding system shown includes a generated bit amount calculation section 1, a quantization variation value calculation section 2, a variation value correction section 3, a quantization determination section 4, a coding section 5 including a quantizer not shown, and a variation value correction frame determination section 6.

The generated bit amount calculation section 1 calculates an amount of bits generated per one coded frame and sends the thus calculated generated bit amount per one coded frame to the quantization variation value calculation section 2 by way of a signal line 23. The quantization variation value calculation section 2 calculates a variation value of a quantization step size based on the generated bit amount received by way of the signal line 23.

For the calculation of the variation value of the quantization step size, the method disclosed, for example, in "Investigation for a Low Bit Rate Moving Picture Coding Control System", Collection of Drafts D-311 for the Spring National Meeting of the Electronic Information Communications Society in 1990 mentioned hereinabove can be used. In particular, a quantization variation value is determined in accordance with a linear function $\Delta Q = a \times I + b \times I'$ of a given value I of the generated bit amount and a first differential value (differential value of a generated bit amount between different frames) I' of the value I. Otherwise, it is possible to calculate a quantization variation value from a difference between generated bit amounts for different frames.

The quantization variation value calculation section 2 transmits the thus calculated quantization variation value to the variation value correction section 3 by way of a signal line 24 and also to the variation value correction frame determination section 6 by way of another signal line 25. The variation value correction frame determination section 6 determines a frame as a frame for which correction of the quantization variation value should be performed when the frame involves a great amount of motion and the quantization variation value is positive in sign and when the frame involves a small amount of motion and the quantization variation value is negative in sign.

The variation value correction section 3 corrects, for a frame which is determined as a frame for which correction of the variation value should be performed by the variation value correction frame determination section 6, the variation value calculated by the quantization variation value calculation section 2 and sends the thus corrected variation value to the quantization determination section 4. On the other hand, for another frame which is determined as a frame for which correction of the variation value should not be performed, the variation value correction section 3 sends the quantization variation value calculated by the quantization variation value calculation section 2 as it is to the quantization determination section 4.

For the correction by the variation value correction section 3, a calculation method may be employed if, where the variation value before correction is represented by $\Delta Q$ and the variation value after correction is represented by $\Delta Q'$, $|\Delta Q'| > |\Delta Q|$, that is, if the absolute value of the variation value after correction is greater than the absolute value of the variation value before correction. For example, the calculation of $\Delta Q' = K \times \Delta Q$ ($K > 1$) may be employed, where K is a scaling factor.

The quantization determination section 4 adds the quantization value received by way of the signal line 26 to the quantization step size of the last frame to determine a new quantization step size for the current frame. The coding section 5 performs coding using the quantization step size thus determined by the quantization determination section 4.

Figure 2:
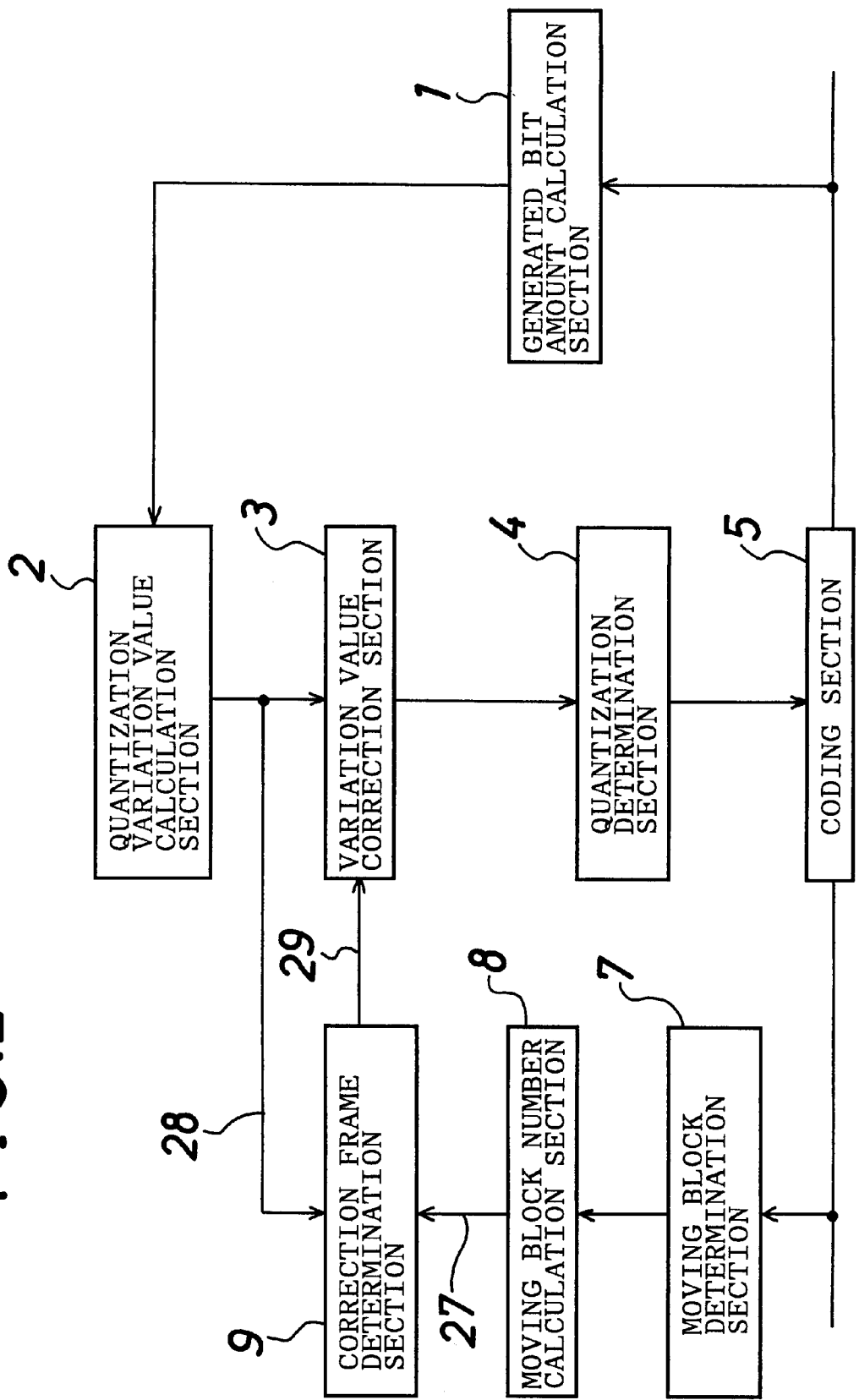
FIG. 2 is a block diagram of another moving picture coding system showing a second preferred embodiment of the present invention.

Referring now to FIG. 2, there is shown a moving picture coding system according to a second preferred embodiment of the present invention. The moving picture coding system of the present embodiment is a modification to and different from the moving picture coding system of the first embodiment shown in FIG. 1 only in that it includes, in place of the variation value correction frame determination section 6, a moving block determination section 7, a moving block number calculation section 8, and a correction frame determination section 9.

The moving block determination section 7 determines moving blocks for each block. For the determination of a moving block, for example, the sum of the absolute values of differential signals between two adjacent frames are calculated for each block, and the result of calculation for each block is processed with a threshold value.

The moving block number calculation section 8 counts the number of blocks which are determined to be moving blocks by the moving block determination section 7, and transmits the thus counted number to the correction frame determination section 9.

The correction frame determination section 9 determines a frame as a frame for which correction of the variation value should be performed when the number of moving blocks of the frame received by way of a signal line 27 is higher than a predetermined moving frame determination threshold value and the quantization variation value received by way of another signal line 28 is positive in sign and when the number of moving blocks of the frame received by way of the signal line 27 is lower than a predetermined stationary frame determination threshold value and the quantization variation value received by way of the signal line 28 is negative in sign, and transmits the determination to the variation value correction section 3 by way of a signal line 29.

Figure 3:
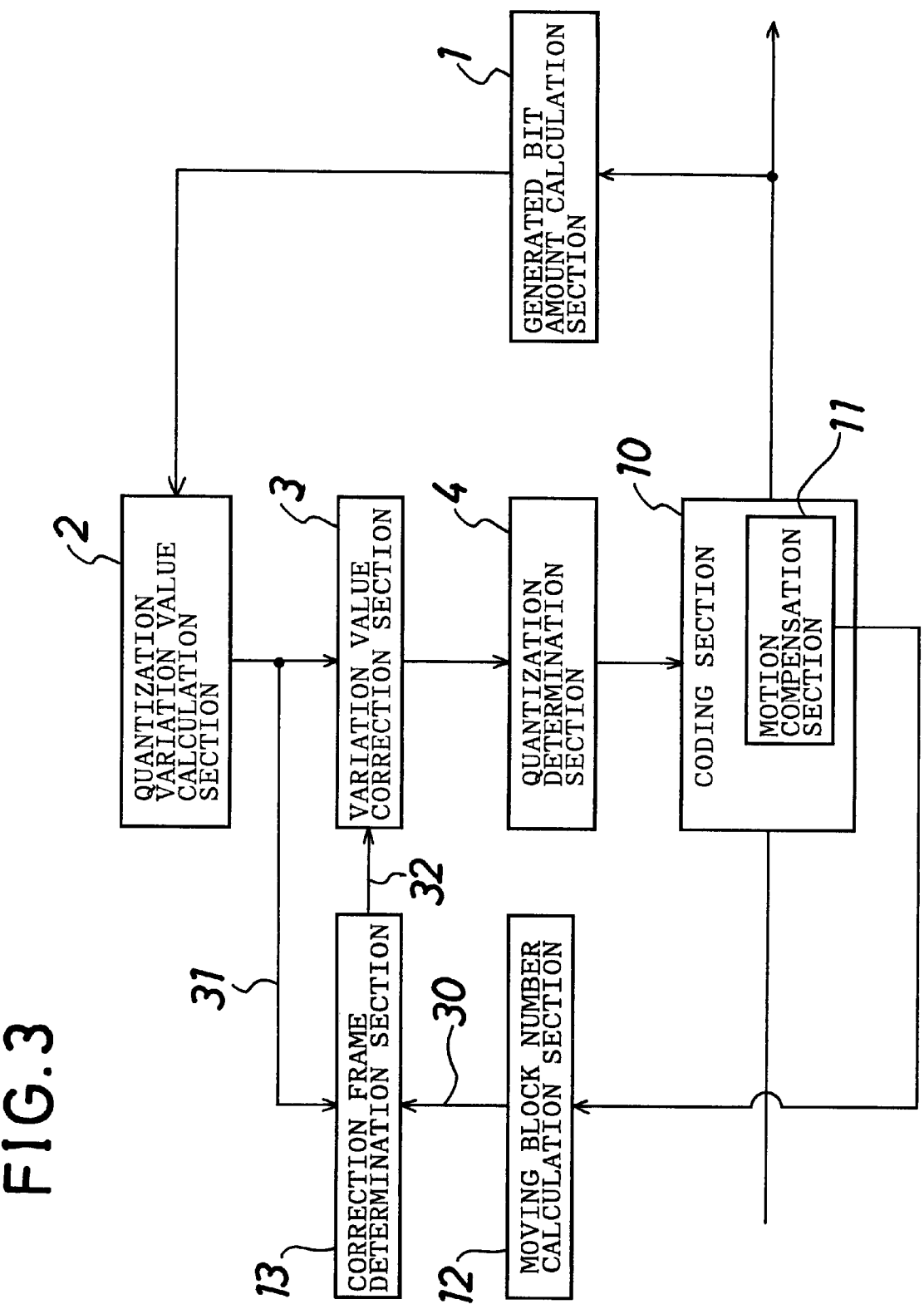
FIG. 3 is a block diagram of a further moving picture coding system showing a third preferred embodiment of the present invention.
Figure 4:
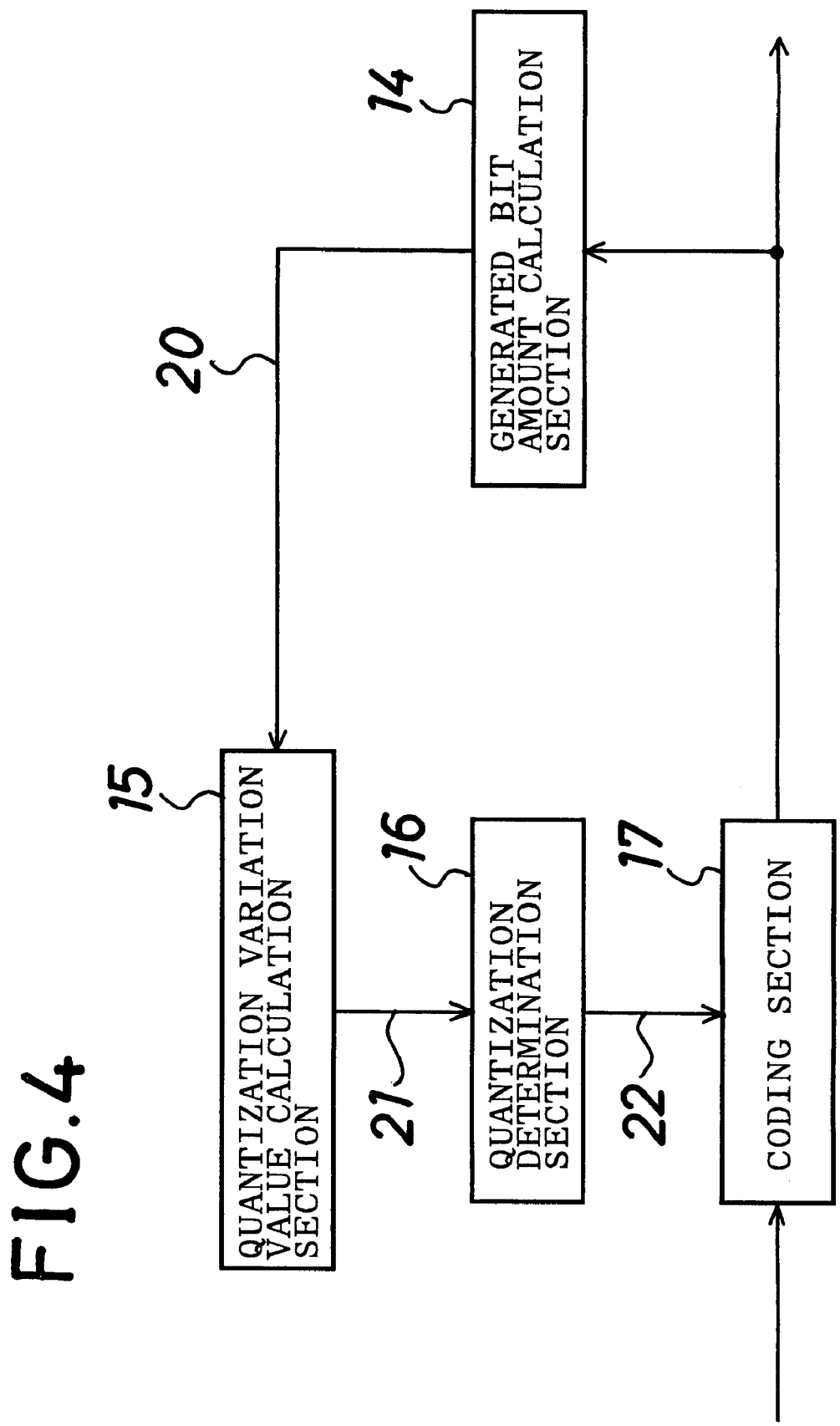
FIG. 4 is a block diagram showing a conventional coding system.

Referring now to FIG. 3, there is shown a moving picture coding system according to a third preferred embodiment of the present invention. The moving picture coding system of the present embodiment is a modification to and different from the moving picture coding system of the first embodiment shown in FIG. 1 only in that it includes, in place of the variation value correction frame determination section 6, a moving block number calculation section 12 and a correction frame determination section 13 and a coding section 10, which is provided in place of the coding section 5, includes, in addition to a quantizer not shown, a motion compensation section 11 for performing motion compensation interframe prediction.

The moving block number calculation section 12 counts the number of blocks whose motion vector for motion compensation is determined to be a non-zero vector by the motion compensation section 11, and transmits the thus counted number to the correction frame determination section 13.

The correction frame determination section 13 determines a frame as a frame for which correction of the variation value should be performed when the number of moving blocks of the frame received from the moving block number calculation section 12 by way of a signal line 30 is higher than a predetermined moving frame determination threshold value and the quantization variation value received from the quantization variation value calculation section 2 by way of another signal line 31 is positive in sign and when the number of blocks received by way of the signal line 30 is lower than a predetermined stationary frame determination threshold value and the quantization variation value received by way of the signal line 31 is negative in sign, and transmits the determination to the variation value correction section 3 by way of a signal line 32.

Having now fully described the invention, it will be apparent to one of ordinary skill in the art that many changes and modifications can be made thereto without departing from the spirit and scope of the invention as set forth herein.

What is claimed is:

1. A moving picture coding system which includes a quantizer for quantization processing, comprising:

generated bit amount calculation means for calculating a generated bit amount for each coded frame;

quantization variation value calculation means for calculating a quantization variation value, which is a variation of a quantization step size from a previous frame to a current frame, in accordance with a difference in the generated bit amount between two most recently coded frames;

variation value correction frame determination means for determining a frame as a frame for which correction of the quantization variation value should be performed when the frame involves a large amount of motion and the quantization variation value is positive in sign or when the frame involves a small amount of motion and the quantization variation value is negative in sign;

variation value correction means for correcting, for said frame determined as the frame for which correction should be performed, the quantization variation value calculated by said quantization variation value calculation means so as to increase an absolute value of the quantization variation value; and quantization determination means for adding the quantization variation value corrected by said variation value correction means to a quantization step size of the previous frame to calculate a new quantization step size for the current frame.

2. A motion picture coding system as claimed in claim 1, wherein said variation value correction frame determination means includes moving block determination means for calculating a sum of the absolute values of differential signals between the previous frame and the current frame for each block to determine moving blocks, moving block number calculation means for calculating a number of moving blocks based on said sum calculated by said moving block determination means for said each block, and correction frame determination means for determining a frame as a frame for which correction of the quantization variation value should be performed when the number of moving blocks of the frame calculated by said moving block number calculation means is higher than a predetermined threshold value for a moving frame and the quantization variation value calculated by said quantizer variation value calculation means is positive in sign or when the number of moving blocks is lower than a predetermined threshold value for a stationary frame and the quantization variation value is negative in sign.

3. A moving picture coding system as claimed in claim 1, further comprising a motion compensation interframe prediction section, wherein said variation value correction frame determination means includes moving block number calculation means for counting the number of blocks whose motion vector is determined to be a non-zero vector by said motion compensation interframe prediction section, and correction frame determination means for determining a frame as a frame for which correction of the variation value should be performed when the number of moving blocks calculated by said moving block number calculation means is higher than a predetermined threshold value for a moving frame and the quantization variation value calculated by said quantization variation value calculation means is positive in sign or when the number of moving blocks is lower than a predetermined threshold value for a stationary frame and the quantization variation value is negative in sign.

4. A moving picture coding system comprising:

a quantizer which generates successive coded frames based on a quantization step size, each of said successive coded frames having a respective bit amount; and a quantization step size variation determiner which calculates a variation in the quantization step size based on a difference of bit amounts between a current coded frame and a previous coded frame, wherein said quantization step size variation is modified to be (i) larger if said quantization step size variation is positive and a large amount of motion is determined between a previous frame and a current frame and (ii) smaller if said quantization step size variation is negative and a small amount of motion is determined between the previous frame and the current frame.

5. A moving picture coding system as claimed in claim 4, further comprising a moving block determination section which determines amount of motion between the previous frame and the current frame.

6. A moving picture coding system as claimed in claim 5, wherein said moving block determination section divides a frame into a plurality of blocks and determines the amount of motion between the previous frame and the current frame based on a number of said blocks which are moving.

7. A moving picture coding system as claimed in claim 6, wherein the large amount of motion corresponds to said number of moving blocks being higher than a predetermined high threshold and the small amount of motion corresponds to said number of moving blocks being lower than a predetermined low threshold.

* * * * *